United States Patent
Su et al.

(10) Patent No.: US 8,897,581 B2
(45) Date of Patent: Nov. 25, 2014

(54) GUIDED POST-PREDICTION FILTERING IN LAYERED VDR CODING

(71) Applicant: Dolby Laboratories Licensing Corporation, San Francisco, CA (US)

(72) Inventors: Guan-Ming Su, Fremont, CA (US); Tao Chen, Palo Alto, CA (US); Peng Yin, Ithaca, NY (US); Sheng Qu, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 163 days.

(21) Appl. No.: 13/706,089

(22) Filed: Dec. 5, 2012

(65) Prior Publication Data

US 2013/0148907 A1 Jun. 13, 2013

Related U.S. Application Data

(60) Provisional application No. 61/568,604, filed on Dec. 8, 2011.

(51) Int. Cl.
*G06K 9/36* (2006.01)
*G06K 9/32* (2006.01)
*G06T 9/00* (2006.01)
*H04N 19/154* (2014.01)
*H04N 19/80* (2014.01)
*H04N 19/117* (2014.01)
*H04N 19/17* (2014.01)

(52) U.S. Cl.
CPC .............. *G06T 9/004* (2013.01); *H04N 19/002* (2013.01); *H04N 19/0089* (2013.01); *H04N 19/00066* (2013.01); *H04N 19/0026* (2013.01)
USPC ......................................... 382/232; 382/299

(58) Field of Classification Search
None
See application file for complete search history.

(56) References Cited

U.S. PATENT DOCUMENTS 5,587,711 A 12/1996 Williams
6,052,491 A 4/2000 Clatanoff
(Continued)

FOREIGN PATENT DOCUMENTS

EP 2109321 10/2009
EP 2169657 3/2010
(Continued)

OTHER PUBLICATIONS

Chun-Hung Liu; Au, O.C.; Wong, P.H.-W.; Kung, M.C.; Shen Chang Chao, "Bit-depth expansion by adaptive filter," Circuits and Systems, 2008. ISCAS 2008. IEEE International Symposium on , vol., no., pp. 496,499, May 18-21, 2008.*

(Continued)

*Primary Examiner* — Andrae S Allison
(74) *Attorney, Agent, or Firm* — Konstantinos Konstantinides

(57) ABSTRACT

A visual dynamic range (VDR) coding system creates a sequence of VDR prediction images using corresponding standard dynamic range (SDR) images and a prediction function. For each prediction image, an encoder identifies one or more areas within the prediction image suitable for post-prediction filtering. For each identified post-prediction area, a post-prediction filtering mode is selected among one or more post-prediction filtering modes. The selected post-prediction filtering mode is applied to output a filtered prediction image. Information related to the post-prediction filtering areas and the selected corresponding post-prediction filtering modes may be communicated to a receiver (e.g., as metadata) for guided post-prediction filtering. Example post-prediction filtering modes that use low-pass averaging filtering or adaptive linear interpolation are also described.

17 Claims, 8 Drawing Sheets

(56) References Cited

U.S. PATENT DOCUMENTS

| | | | |
|---|---|---|---|
| 6,075,475 A * | 6/2000 | Ellis et al. | 341/144 |
| 7,469,069 B2 * | 12/2008 | Kim et al. | 382/236 |
| 7,519,118 B2 * | 4/2009 | Lin et al. | 375/240.25 |
| 7,596,263 B2 * | 9/2009 | Sasaki | 382/162 |
| 7,853,088 B2 * | 12/2010 | Sakazume et al. | 382/232 |
| 8,237,689 B2 * | 8/2012 | Nagase et al. | 345/204 |
| 8,625,916 B2 * | 1/2014 | Sohn et al. | 382/238 |
| 2007/0147494 A1 | 6/2007 | Shimauchi | |
| 2008/0095235 A1 | 4/2008 | Hsiang | |
| 2008/0165848 A1 | 7/2008 | Ye | |
| 2009/0257486 A1 * | 10/2009 | Chiu et al. | 375/240.02 |
| 2010/0046612 A1 | 2/2010 | Sun | |
| 2010/0189349 A1 * | 7/2010 | Miyasaki | 382/167 |

FOREIGN PATENT DOCUMENTS

| | | |
|---|---|---|
| WO | 2010/105036 | 9/2010 |
| WO | 2012/027405 | 3/2012 |

OTHER PUBLICATIONS

Chun Hung Liu et al. "Bit-Depth Expansion by Adaptive Filter" IEEE International Symposium on Circuits and Systems, ISCAS 2008, Piscataway, NJ, USA, May 18, 2008, pp. 496-499.

McNeely, J. et al. "Voodoo Error Prediction for Bit-Depth Scalable Video Coding" IEEE International Conference on Imaging Processing (ICIP), 2009, pp. 3757-3760.

* cited by examiner

8,897,581 B2

GUIDED POST-PREDICTION FILTERING IN LAYERED VDR CODING

CROSS-REFERENCE TO RELATED APPLICATIONS

This application claims priority to U.S. Provisional Patent Application Ser. No. 61/568,604, filed on Dec. 8, 2011, hereby incorporated by reference in its entirety.

TECHNOLOGY

The present invention relates generally to images. More particularly, an embodiment of the present invention relates to the guided filtering of prediction signals in layered coding of images with extended dynamic range.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'extended dynamic range', 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term VDR images or pictures may relate to images or pictures wherein each pixel component is represented by more than 8 bits.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

As with the scalable video coding and HDTV technologies, extending image DR typically involves a bifurcate approach. For example, scene referred HDR content that is captured with a modern HDR capable camera may be used to generate an SDR version of the content, which may be displayed on conventional SDR displays. In one approach, generating the SDR version from the captured VDR version may involve applying a global tone mapping operator (TMO) to intensity (e.g., luminance, luma) related pixel values in the HDR content. In a second approach, generating an SDR image may involve applying an invertible operator (or predictor) on the VDR data, such as a uniform quantizer. To conserve bandwidth or for other considerations, transmission of the actual captured VDR content may not be a best approach.

Thus, an inverse tone mapping operator (iTMO), inverted in relation to the original TMO, or an inverse operator in relation to the original predictor, may be applied to the SDR content version that was generated, which allows a version of the VDR content to be predicted. The predicted VDR content version may be compared to originally captured HDR content. For example, subtracting the predicted VDR version from the original VDR version may generate a residual image. An encoder may send the generated SDR content as a base layer (BL), and package the generated SDR content version, any residual image, and the iTMO or other predictors as an enhancement layer (EL) or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays.

The SDR to VDR prediction process in VDR layered coding and decoding maps data with low bit depth (e.g., 8-bits per color component) to data with high bit depth (e.g., 10 or more bits per color component). Hence, a single SDR codeword may correspond to multiple original VDR data, which may cause inaccuracies in the prediction process.

One measure of the predictor's accuracy is the magnitude of the residual error, which is computed as the difference between the original VDR signal and the predicted VDR signal. A high residual error increases the bit rate requirements in the enhancement layer and may also be indicative of coding artifacts, such as false contours, in the base layer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Guided filtering of prediction signals in VDR layered coding is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the guided filtering of prediction signals to reduce the residual error in layered VDR coding. In an embodiment, a visual dynamic range (VDR) coding system creates a sequence of VDR prediction images using corresponding standard dynamic range (SDR) images and a prediction function. For each prediction image, the encoder identifies one or more areas within the prediction image suitable for post-prediction filtering. For each identified post-prediction area, a post-prediction filtering mode is selected among one or more post-prediction filtering modes. The selected post-prediction filtering mode is applied to output a filtered prediction image. Information related to the post-prediction filtering areas and the selected corresponding post-prediction filtering modes may be communicated to a receiver (e.g., as metadata). Example post-prediction filtering modes that use low-pass averaging filtering or adaptive linear interpolation are also described.

In another embodiment, a VDR decoding system generates one or more prediction images using corresponding baseline SDR images and a prediction function. For each prediction image, it may also receive information related to at least one post-prediction filtering area in the prediction image and a corresponding post-prediction filtering mode. A post-prediction filter is selected based on the received information and is applied to the post-prediction area to output a filtered prediction image.

Example Layered VDR System

Figure 1:
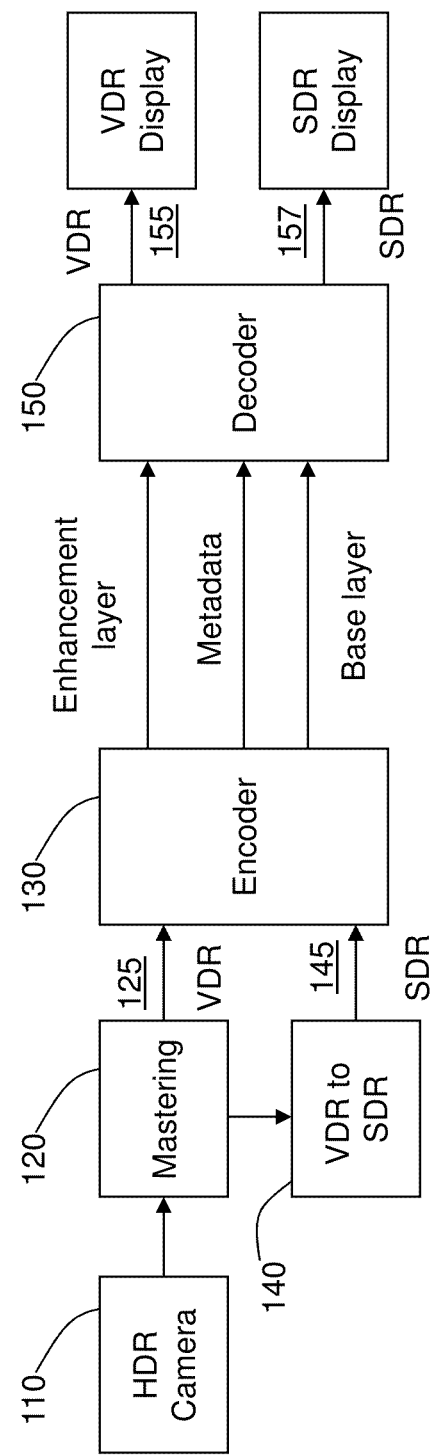
FIG. 1 depicts an example data flow for a VDR layered coding system according to an embodiment of the present invention.

FIG. 1 depicts an example processing flow in a VDR coding system 100, according to an embodiment of the present invention. An HDR image or video sequence is captured using HDR camera 110. Following capture, the captured image or video is processed by a mastering process to create a target VDR image sequence 125. The mastering process may incorporate a variety of processing steps, such as: editing, primary and secondary color correction (or color grading), color transformation, and noise filtering. The VDR output 125 of this process represents the director's intent on how the captured image will be displayed on a target VDR display.

The mastering process may also output a corresponding SDR image 145, representing the director's intent on how the captured image will be displayed on a legacy SDR display. The SDR output 145 may be provided directly from mastering circuit 120 or it may be generated by a separate VDR-to-SDR converter 140.

In this example embodiment, the VDR 125 and SDR 145 signals are input into an encoder 130. Purpose of encoder 130 is to create a coded bitstream that reduces the bandwidth required to transmit the VDR and SDR signals, but also allows a corresponding decoder 150 to decode and render either the SDR or VDR signals. In an example implementation, encoder 130 may be a layered encoder, such as one of those defined by the MPEG-2 and H.264 coding standards, which represents its output as a base layer, an optional enhancement layer, and metadata. As used herein, the term "metadata" denotes any ancillary information that is embedded or transmitted in parallel with the coded bitstream and assists a decoder to render a decoded image. Such metadata may include, but are not limited to, such data as: color space or gamut information, dynamic range information, tone mapping information, or prediction coefficients, such as those described herein.

On the receiver, a decoder 150, uses the received coded bitstreams and metadata to render either an SDR image or a VDR image, according to the capabilities of the target display. For example, an SDR display may use only the base layer and the metadata to render an SDR image. In contrast, a VDR display may use information from all input layers and the metadata to render a VDR signal.

Figure 2:
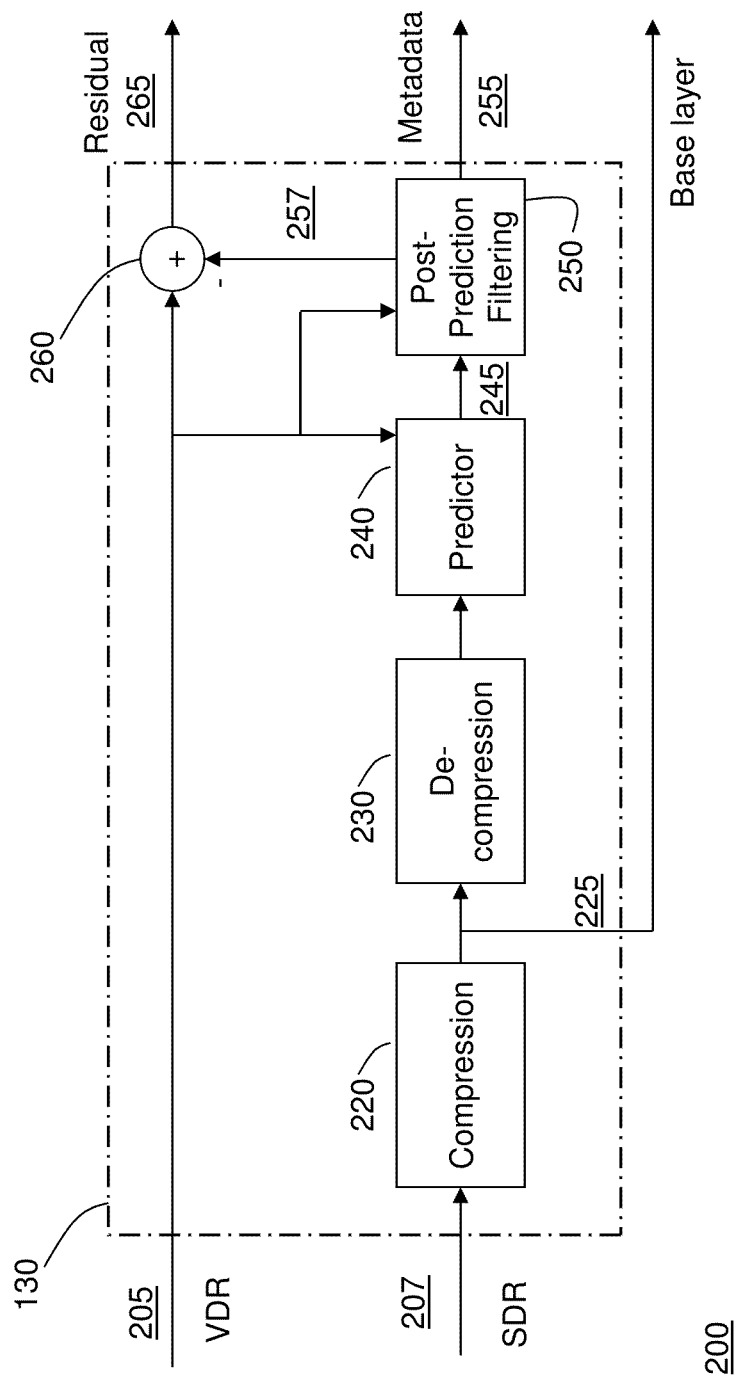
FIG. 2 depicts an example VDR encoding system according to an embodiment of the present invention.

FIG. 2 depicts in more detail an example implementation of encoder 130 incorporating the methods of this invention. In FIG. 2, the SDR signal 207 represents a base layer signal with a lower dynamic range than the dynamic range of VDR signal 205. In one embodiment, SDR 207 may comprise pixels using 8-bits per color component, 4:2:0, ITU Rec. 709 data. SDR may have the same color space (primaries and white point) as VDR, or it may be in a different color space than the VDR signal 205. The base layer SDR signal 207 is applied to compression system 220. Depending on the application, compression system 220 can be either lossy, such as H.264 or MPEG-2, or lossless. The output of the compression system 220 may be transmitted as a base layer 225. To reduce drift between the encoded and decoded signals, encoder 130 may follow compression process 220 with a corresponding decompression process 230. The output (245) of predictor 240, represents an approximation or estimate of input VDR 205. In one embodiment, predictor 240 may comprise an inverse tone mapping operator. In other embodiments, predictor 240 may comprise inverse linear or non-linear quantizers, or predictors based on multivariate, multi-regression estimation. According to an embodiment, the output 245 of predictor 240 may be followed by post-prediction filtering 250 to reduce the residual error 265.

Post-prediction filtering 250 may be applied to a single color component of the predictor output 245 (e.g., only on Y on a YCbCr image), or to two or more components.

Adder 260, subtracts the predicted VDR 257 from the original VDR 205 to form output residual signal 265. Subsequently (not shown), residual 265 may also be coded by another lossy or lossless encoder, and may be transmitted to the decoder as an enhancement layer.

Predictor 240 and post-prediction filtering 250 may also communicate to the decoder 150 (e.g., as metadata 255) the prediction and filtering parameters being used in the prediction process. Since these parameters may change during the encoding process, for example, on a frame by frame basis, or on a scene by scene basis, these metadata may be transmitted to the decoder as part of the data that also include the base layer and the enhancement layer.

Figure 3:
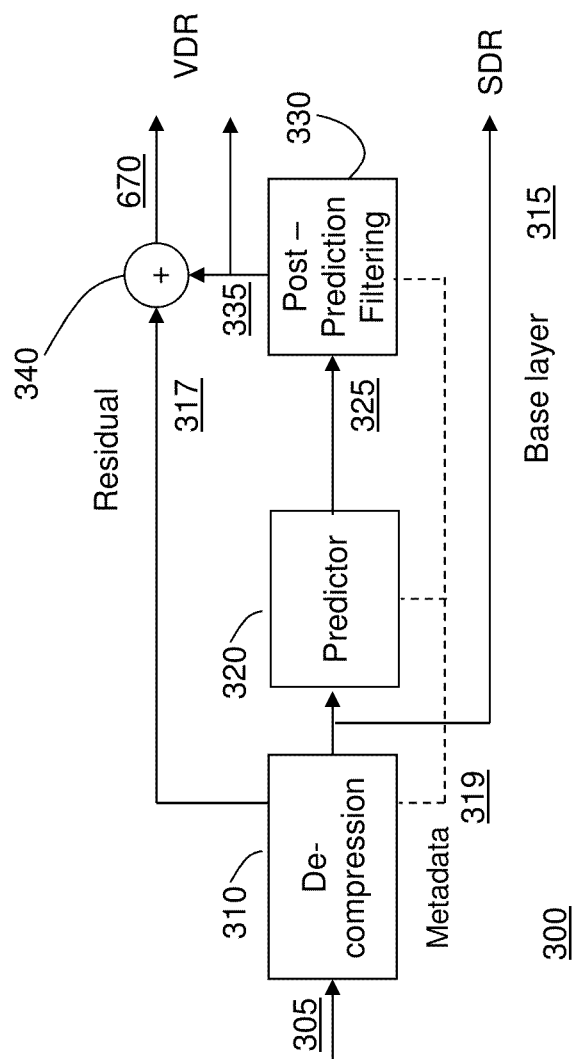
FIG. 3 depicts an example VDR decoding system according to an embodiment of the present invention.

Embodiments of the present invention may be implemented on both encoding and decoding VDR systems. FIG. 3 shows an example implementation of decoder 150 according to an embodiment of this invention. Decoding system 300 receives a compressed bitstream 305 that may combine a base layer 315, an optional enhancement layer (or residual) 317, and metadata 319, which are extracted following decompression 310. For example, in a VDR-SDR system, the base layer 315 may represent the SDR representation of the coded signal and the metadata 319 may include information about the prediction model and post-prediction filtering that was used in the encoder predictor 240 and post-prediction filtering 250. Post-prediction filtering 330 matches the operation of post-prediction filtering 250 in the encoder and outputs a predicted VDR signal 335. If there is no residual, or the residual is considered perceptually negligible, then the predicted value 335 can be outputted directly as the final VDR image. Otherwise, in adder 340, the output 335 of the post-prediction filtering unit 330 is added to the residual 317 to output VDR signal 670.

Example Guided Post-Prediction Filtering

Figure 4:
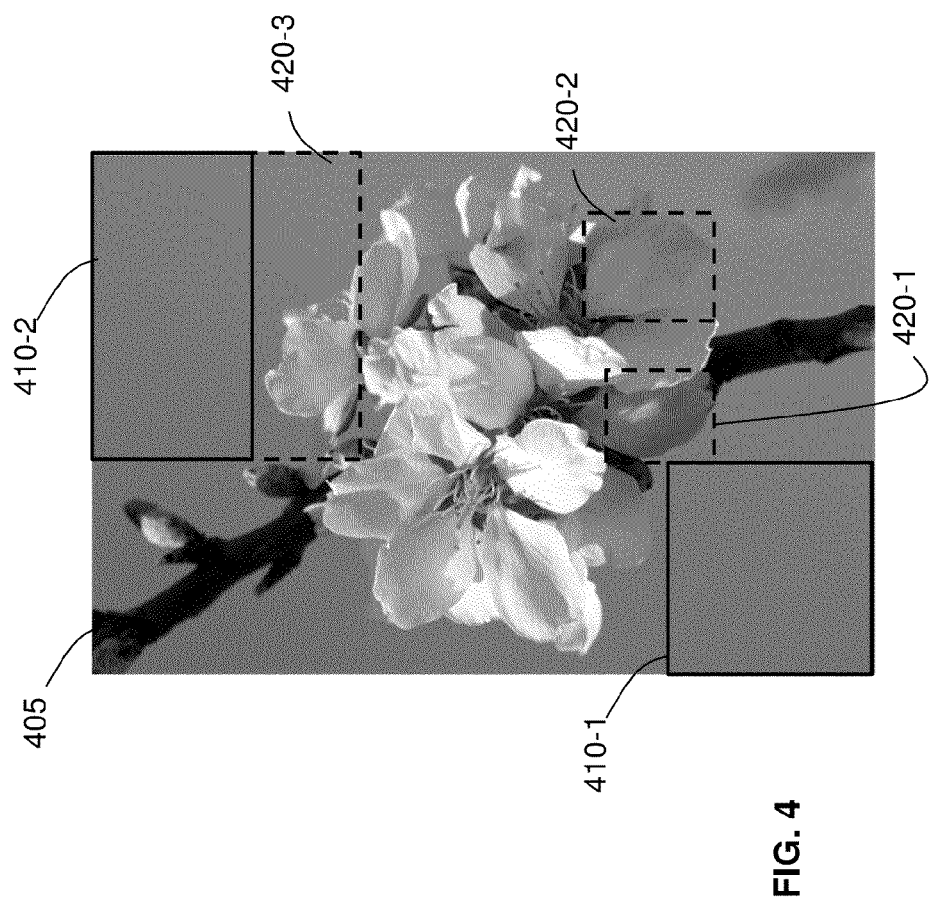
FIG. 4 depicts an example VDR image with primary and secondary areas of interest for post-prediction filtering according to an embodiment of the present invention.

As depicted in FIG. 4, most images may include areas such as regions 410-1 and 410-2 that are relatively homogeneous and "flat"; for instance, compared to other areas in the image, changes in brightness in these areas are either small or relatively monotonic. In such regions, neighboring pixels exhibit strong spatial correlation, which could be used to improve prediction accuracy and reduce the overall residual error. As used herein, the term "area for post-prediction filtering" denotes an image region that has been identified to be suitable for post-prediction filtering using methods as described herein.

Figure 5:
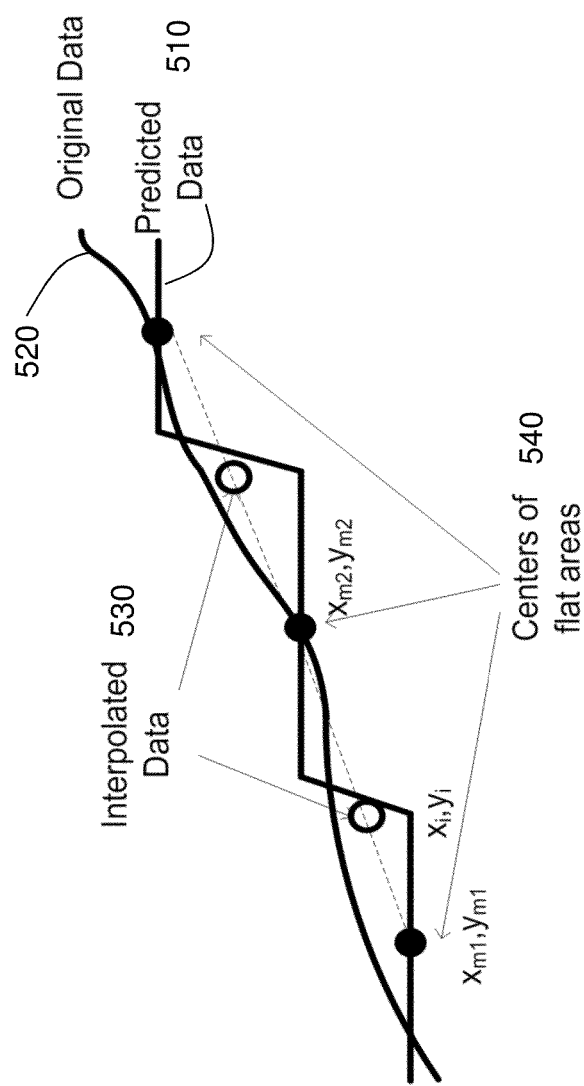
FIG. 5 depicts an example of input predicted data and corresponding output filtered predicted data using linear interpolation according to an embodiment.

Given VDR input 520, FIG. 5 depicts an example output 510 of a predictor (e.g., 240 or 320) when the input data (e.g., 520) is increasing monotonic. Since the original data and the SDR data have different bit depths, multiple VDR pixel values may be mapped to a single SDR pixel value; hence, predicted data 510 have typically a stair-case look. In an embodiment, the residual between the original data 520 and the predicted data 510 can be reduced by appropriate post-prediction filtering of the predicted data 510. Such filtering may be performed on a single color component (e.g., luma Y) or independently on two or more color components.

In one embodiment, the predictor output 510 may be filtered using an averaging low-pass filter. As used herein the term "averaging low-pass filter" denotes an N-tap filter (e.g., N=3) where all filter-tap coefficients are equal. For example, given input pixels $y_i$, the output of such a filter may be denoted as $$\bar{y}_i = \frac{1}{N} \sum_{i=1}^{N} y_i. \tag{1}$$

Because the same predictor may be used by both the encoder 200 and a decoder 300, in an embodiment, identical post prediction filtering (e.g., 250 and 330) may be applied to both the encoder and the decoder; however, post-prediction filtering in the decoder may be guided by information transmitted by the encoder, e.g., as metadata. For example, when the post-prediction filter 250 comprises an N-tap averaging filter (where N is an integer), this filter may be easily identified to a decoder by simply sending a flag related to the filter type being used (e.g., FILT=AVG) and a variable related to the number of filter taps being used (e.g., TAPS=3).

In an embodiment, the predictor output 510 may be filtered using a low-pass filter with arbitrary filter tap weights. Such a filter may be selected among a family of filters known by both the encoder and the decoder and the filter may be identified to a decoder by transmitting a flag related to the filter type being used (e.g., FILT=LPF) and a variable related to filter being used being used (e.g., LPF_index=3).

Fixed low-pass filters may perform well in areas where the predictor output has relatively constant slope, thus resulting in stair steps of uniform step size; however, when the stair steps have varying step size, a linear interpolation of pixel values based on a local gradient estimate may yield better results.

As depicted in FIG. 5, given a stair-like output 510 of a predictor (e.g. 340), let $(x_{m1}, y_{m1})$ and $(x_{m2}, y_{m2})$ denote the center points of two neighboring flat step areas. Then, pixel values positioned in-between these two centers can be re-computed (or filtered) using linear interpolation. For example, a pixel value $(x_i, y_i)$ 530 can be estimated using the values of the centers (middle points) in the bracketing stair steps, as $$y_i = y_{m1} + \left( \frac{y_{m2} - y_{m1}}{x_{m2} - x_{m1}} \right)(x_i - x_{mi}), \tag{2}$$

where $m1 < i < m2$.

In an embodiment, linear interpolation filtering may be preceded by median filtering to better identify the stair steps in the predictor's output. In other embodiments, linear interpolation may be replaced by other interpolations schemes, such as bilinear or spline interpolation.

Figure 6:
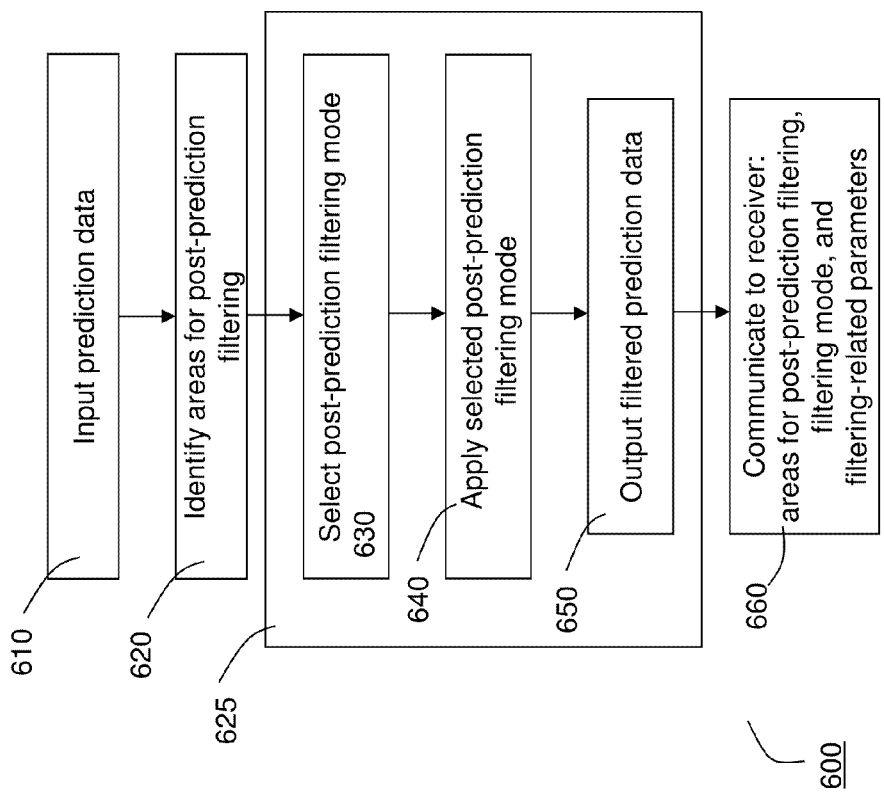
FIG. 6 depicts a method for guided filtering of prediction data in an encoder according to an embodiment of the present invention.

FIG. 6 depicts an example method for guided post-prediction filtering in layered encoding according to an embodiment. In step 610, input data to this method comprises the output data of an SDR to VDR predictor (e.g. 240). In step 620, for each input frame, the encoder (e.g., 200) may identify areas (e.g., 410) suitable for post-prediction filtering; that is, areas where post-prediction filtering may reduce the residual error 265 and/or improve image quality in the decoder. In one embodiment, an encoder may partition the image into a sequence of non-overlapping blocks. Then, for each block, the encoder may determine that the block is suitable for post-prediction filtering based on whether variations in brightness within the block are either very small or monotonic.

In an embodiment, after a prediction image is divided into non-overlapping blocks, for each block, the encoder may apply a variety of filtering schemes, as those described herein, to determine whether the overall residual for that block will decrease or not. If the residual decreases, then that block may be marked as area for post-prediction filtering.

In an embodiment, the encoder may compute a first estimate of the residual 265 given the current output 245 of the predictor and without applying any post-prediction filtering. Then, using this estimate of the residual image, the encoder may apply a false-contour detection algorithm that will identify block areas where false contours may be visible in the decoder. An example of such a method is described in PCT Application with Ser. No. PCT/US2012/062958, filed on Nov. 1, 2012, "Adaptive false contouring prevention in layered coding of images with extended dynamic range," by G-M Su, et al. Such areas where false contours may be detected may also be marked as areas for post-prediction filtering.

After the areas of post-prediction filtering have been identified, step 625, which comprises steps 630, 640, and 650, is repeated for all such identified areas within each input frame. Depending on the characteristics of the identified area, in step 630, method 600 may make a decision on what type of filtering will reduce the residual error the most. For example, the method may select to apply to each scan line a low-pass filter. In other embodiments, it may select to apply a 1-D interpolation filter. In some other embodiments it may select to apply a 2-D interpolation filter, where a 1-D filter is applied first to the horizontal scan lines and then to the vertical scan lines.

Figure 7:
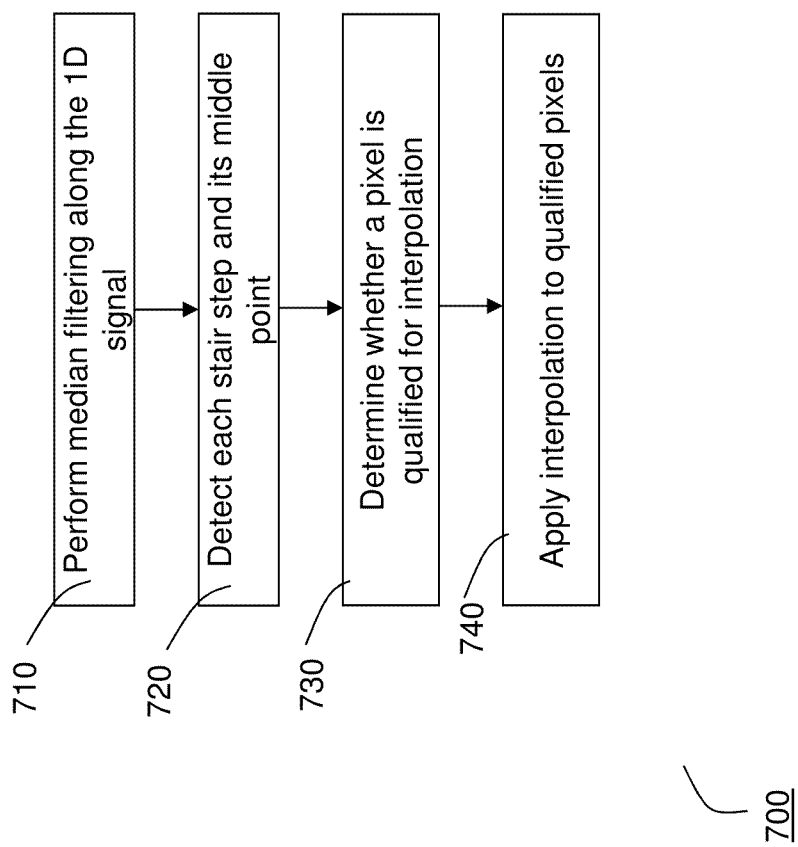
FIG. 7 depicts a method for interpolation-based filtering of predicted data according to an embodiment of the present invention.

In step 640, the selected filtering mode is applied to the identified area and filtered prediction data are outputted (e.g., 257) to generate the final residual signal. In some embodiments filtering may be performed using 1-D filters, as those described herein. In other embodiments, filtering may be performed using known in the art 2-D low-pass filters. FIG. 7 depicts a method 700 of 1-D interpolation-based filtering according to an example embodiment. The process comprises steps 710-740 which are repeated for each scan line (horizontal or vertical) of the input to the filter area.

The process starts in step 710 by first performing median filtering across the input data. The media filtering process makes it easier to identify steps within the original predicted output data. Given median-filtered data, step 720 identifies stair steps and their corresponding characteristics, such as step start, step end, and step mid-point coordinates, and a step mid-point value. In some embodiments, the step mid-point value comprises the original input value and not the median-filtered value. Next, in step 730, the method identifies those pixels for which it will perform linear interpolation. For example, in some embodiments, no filtering may be performed for pixels

- In the first half of the first step and the second half of the last step
- In stairs, where the left and right neighboring stairs have only a length of one In step 740, interpolation filtering (e.g., using equation (2)) is performed. An example implementation of a 1-D interpolation-based filter implemented according to method 700 in pseudo code is depicted in Table 1. In other embodiments, 2-D post-prediction interpolation filters may be applied. For example, an embodiment may implement a separable 2-D filter using the 1-D interpolation filter disclosed in Table 1. Under this implementation, after applying the 1-D filter to the horizontal scan lines of the prediction image, the same filter may applied again to the vertical scan lines of the filtered output. Other embodiments, may apply different horizontal and vertical 1-D filters or they may implement 2-D post-prediction interpolation using a 2-D filter kernel.

Returning to FIG. 6, in step 660, data relevant to post-prediction filtering may also be captured and communicated to the receiver, e.g., as metadata. In some embodiments, for each area to be filtered, these data may comprise the following information:

The position of the post-prediction area in the frame (e.g., the coordinates of the top-left pixel in that area relative to the top-left pixel of the whole frame)

The width and height of that area

The filtering direction (e.g., 1-D vertical only, 1-D horizontal only, or 2-D)

Any other varying filtering-related information (e.g., the size of the median filter, the number of filter taps for averaging filters, an index to a family of low-pass filters, or other thresholds and filtering variables)

TABLE 1

```
OUT = spatial_prediction_LINE( IN , N, MR )
// N is the number of pixels in the input line IN
// (A) perform median filtering
FIN = median filtering for each pixel in IN with neighborhood size MR.
// (B) find stairs and related information
cnt = 0;
STAIR_start[cnt] = 0;
for i = 0 : 1 : N−2
    STAIR_map[i] = cnt ;
    if ( FIN[ i ] − FIN[ i + 1 ] != 0)
        // ending point of each stair step
        STAIR_end[cnt] = i ;
        // middle point of each stair step
        STAIR_mid[cnt] = floor( ( STAIR_start[cnt] + STAIR_end[cnt]   ) / 2 );
        // corresponding value for middle point of each stair step
        (NOTE: it's the original data, not FIN)
        STAIR_val[cnt] = IN[STAIR_mid[cnt]];
        // length of each stair step
        STAIR_len[cnt] = STAIR_end[cnt] − STAIR_start[cnt] + 1;
        cnt ++;
        // starting point of each stair step
        STAIR_start[cnt]= i + 1 ;
    end
end
// (C) for each pixel, determine whether to perform linear
interpolation
for i = 0 : 1 : N−1
    j = STAIR_map[i];
    if( ( j == 0 ) && ( j == cnt−1 ) )
        // no filtering for first half of the first step and the
second half of the last step; for smooth transition
        OUT[i] = IN[i];
    else if( ( STAIR_len[ j − 1 ] <= TH1 ) && ( STAIR_len[ j +1] <= TH1 ) )
        // no filtering for pixel located in a stair with two
neighboring stairs with length smaller than threshold TH1 (e.g., TH1=1)
        OUT[i] = IN[i];
    else            // perform filtering
        OUT[i] = filter (STAIR_mid[j], STAIR_mid[j+1],
STAIR_val[j], STAIR_val[j+1]);
    end
end
```

Figure 8:
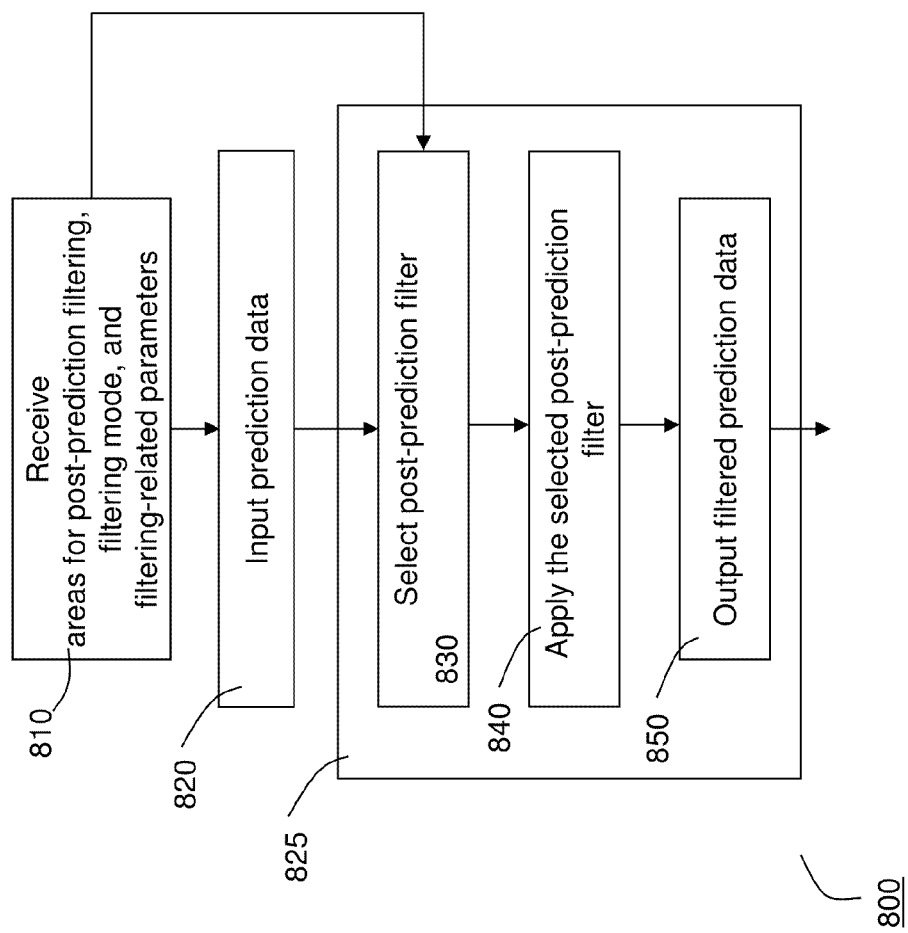
FIG. 8 depicts a method for guided filtering of prediction data in a decoder according to an embodiment of the present invention.

FIG. 8 depicts an example method for guided post-prediction filtering in layered decoding (e.g. 330) according to an embodiment. The process starts with step 810 where through metadata or other ancillary data, for each frame, the receiver receives information related to the areas for which additional post-prediction filtering may be performed. Hence, for each area, the receiver will already know the recommended filtering mode and the corresponding filter characteristics (e.g., the width of media filtering or the number of taps in an averaging filter.).

Given this information, step 825, which comprises steps 830, 840, and 850, is repeated for all areas of interest in the input data. Steps 830, 840, and 850, correspond to the steps of 630, 640, and 650 on the encoder, except that in step 830 the decoder selects the filtering mode based on the input metadata. By using the guided information from the encoder, the decoder's operation is simplified while it matches all operations performed on the encoder side.

As depicted in FIG. 4, for simplicity of implementation, example embodiments define the post-prediction filtering areas as rectangular; however, the methods described herein can be easily extended to define post-prediction filtering areas using other regular shapes or even arbitrarily shaped areas. For example, the ISO/IEC 14496-2, MPEG-4, part 2, international standard on video coding provides techniques to communicate arbitrary shapes from an encoder to the decoder using sprites.

Example Guided Post-Prediction Processing in Residual-Free VDR Coding

Methods described so far assume that there is always a residual 265 that is compressed as an enhancement layer. Since on the decoder the residual 317 is added to the output of the post-prediction filter (e.g., 335), the post-prediction filtering on the decoder (e.g., 330) should match the post-prediction filtering in the encoder (e.g., 250). However, when the residual is negligible or non-existent, the decoder VDR output 335 may be further improved by performing additional filtering, as guided by additional metadata provided by the encoder.

FIG. 4 depicts example areas 420 where additional decoder post-prediction processing may further improve reducing potential artifacts, such as false contours. These areas may not be considered flat or monotonic enough by the encoder to be processed by the regular post-prediction filter, but may processed by a modified post-prediction filter as described herein. The coordinates of these secondary "post-prediction processing areas" (e.g., position, width, and height) and other ancillary information may also be communicated to the decoder.

Table 2 depicts in pseudo code an example implementation of an 1-D, interpolation-based, post-processing filter with variable threshold control. This embodiment is similar to the method 700 described earlier, but with minor modifications in steps 730 and 740.

TABLE 2

```
// (C) for each pixel, determine whether to perform linear
interpolation
for i = 0 : 1 : N-1
    j = STAIR_map[i];
    if( ( j == 0 ) && ( j == cnt-1 ) )
        // no filtering for first half of the first step and the
second half of the last step; for smooth transition
        OUT[i] = IN[i];
    else if( ( STAIR_len[ j - 1 ] <= TH1 ) &&
( STAIR_len[ j +1] <= TH1 ) )
        // no filtering for pixel located in a stair with two
neighboring stairs with length smaller than threshold TH1 (e.g., TH1=1)
        OUT[i] = IN[i];
    else        // perform filtering
        if( pixel i is in the high confidence level area)
            OUT[i] = filter (STAIR_mid[j], STAIR_mid[j+1],
STAIR_val[j], STAIR_val[j+1]);
        else        // less confident area - Start
            if( ( STAIR_len[ j - 1 ] <= TH2 ) &&
( STAIR_len[ j +1] <= TH2 ) )
                // no filtering for pixel located in a stair
with two neighboring stairs with length smaller than threshold TH2
                OUT[i] = IN[i];
            else        // perform filtering
                OUT[i] = filter (STAIR_mid[j],
STAIR_mid[j+1],    STAIR_val[j], STAIR_val[j+1]);
            end
        end    // less confident area - End
    end
end
```

From Table 2, in step 730, for less confidence areas, there is no interpolation-based filtering for pixels located between two bracketing stair steps smaller than a given threshold TH2 (e.g., TH2=3). In general, small step sizes indicate that the area may be dominated by sharp edges or non-monotonic brightness variations. In such areas, it may be better to not perform any filtering, since such filtering tends to smooth and blur picture output.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to post-prediction filtering, such as those described herein. The computer and/or IC may compute any of a variety of parameters or values that relate to post-prediction filtering as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement for post-prediction filtering as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to post-prediction filtering in coding VDR sequences are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
accessing a prediction image;
identifying at least one post-prediction filtering area within the accessed prediction image;
selecting a post-prediction filtering mode among one or more post-prediction filtering modes, wherein the post-prediction filtering mode comprises:
accessing an array of input data;
performing median filtering to the array of input data to output first filtered data;
processing the first filtered data to determine one or more stair steps;
for each of the one or more determined stair steps, determining a step length, a middle step position, and a middle step value; and
for at least an input data point in the array of input data computing a new value for the input data point, wherein the new value is proportional to two or more middle step values that bracket the input data point;
applying the selected post-prediction filtering mode to the at least one post-prediction filtering area;
outputting a filtered prediction image based on the post-prediction filtering mode that is applied to the at least one post-prediction filtering area; and
communicating to a receiver information related to the at least one post-prediction filtering area and the selected post-prediction filtering mode.

2. The method of claim 1, further comprising:
accessing a first input image of a first dynamic range;
accessing a second input image of a second dynamic range, wherein the second dynamic range is lower than the first dynamic range;
generating the prediction image using the second input image and a predictor function;
generating a residual image using the first input image and the filtered prediction image;
compressing the second image as a base layer image; and
compressing the residual image as one or more enhancement layer images.

3. The method of claim 2 wherein the first input image comprises a visual dynamic range (VDR) image and the second input image comprises a standard dynamic range (SDR) image.

4. The method of claim 1 wherein the information related to the at least one post-filtering area and the selected post-prediction filtering mode is communicated to the receiver as metadata.

5. The method of claim 1, wherein the post-prediction filtering mode comprises an averaging low-pass filter with a number N of filtering taps, and the information to be communicated to the receiver comprises the number N of filter taps in the averaging low-pass filter.

6. The method of claim 1, wherein the post-prediction filtering mode comprises a low-pass filter that is selected from among two or more low-pass filters.

7. The method of claim 1, wherein the information related to the at least one post-prediction filtering area comprises information that relates to position, width, or height.

8. The method of claim 1, further comprising determining whether the input data point is qualified for interpolation by determining that the step length of at least one of the stair steps that bracket the input data point is larger than one.

9. An apparatus comprising a processor and configured to perform any one of the methods recited in claim 1.

10. A non-transitory computer-readable storage medium having stored thereon computer-executable instruction for executing a method in accordance with claim 1.

11. A method comprising:
accessing a prediction image;
accessing information related to at least one post-prediction filtering area in the prediction image and a post-prediction filtering mode;
selecting a post-prediction filter based on the received information related to the post-prediction filtering mode, wherein the post-prediction filter mode comprises:
accessing an array of input data;
performing median filtering to the array of input data to output first filtered data;
processing the first filtered data to determine one or more stair steps;
for each of the one or more determined stair steps, determining a step length, a middle step position, and a middle step value; and
for at least an input data point in the array of input data computing a new value for the input data, wherein the new value is proportional to the two or more middle step values that bracket the data point;
applying the post-prediction filter to the at least one post-prediction filtering area; and
outputting a filtered prediction image based on the post-prediction filter that is applied to the at least one post-prediction filtering area.

12. The method of claim 11, further comprising:
accessing a residual image;
accessing a baseline image of a first dynamic range;
generating the prediction image using the baseline image and a prediction function, wherein the prediction image has a second dynamic range, higher than the first dynamic range.

13. The method of claim 12, further comprising adding the residual image to the filtered prediction image to output an output image of a second dynamic range.

14. The method of claim 13, wherein the output image comprises a visual dynamic range (VDR) image.

15. The method of claim 11, further comprising determining whether the input data point is qualified for interpolation by determining that the length of at least one of the stair steps that bracket the input data point is larger than a threshold, wherein the threshold is equal or larger than two.

16. An apparatus comprising a processor and configured to perform any one of the methods recited in claims 11.

17. A non-transitory computer-readable storage medium having stored thereon computer-executable instruction for executing a method by a computer in accordance with claim 11.

* * * * *